United States Patent
Webster et al.

(10) Patent No.: US 6,586,506 B2
(45) Date of Patent: Jul. 1, 2003

(54) COLORED WAX ARTICLES

(75) Inventors: Joseph R. Webster, Charlotte, NC (US); Stephen E. Russell, Grayslake, IL (US)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/899,726

(22) Filed: Jul. 5, 2001

(65) Prior Publication Data

US 2001/0051680 A1 Dec. 13, 2001

Related U.S. Application Data

(63) Continuation of application No. 09/169,877, filed on Oct. 12, 1998, now Pat. No. 6,262,153.

(51) Int. Cl.$^7$ ................................................. C08K 5/34
(52) U.S. Cl. ........................ 524/99; 524/104; 524/306; 524/308
(58) Field of Search .......................... 524/99, 104, 306, 524/308

(56) References Cited

U.S. PATENT DOCUMENTS

| | | | |
|---|---|---|---|
| 3,706,701 A | 12/1972 | Susi | 260/45.85 V |
| 4,060,569 A | 11/1977 | Woods et al. | 260/683.15 R |
| 4,239,546 A | 12/1980 | Russell et al. | 106/270 |
| 4,260,732 A | 4/1981 | Ching | 528/192 |
| 4,301,209 A | 11/1981 | Lorenz et al. | 428/339 |
| 4,404,257 A | 9/1983 | Olson | 428/412 |
| 4,410,594 A | 10/1983 | Olson | 428/412 |
| 5,439,958 A | 8/1995 | Scrima et al. | 524/102 |
| 5,508,025 A | 4/1996 | Hoshino et al. | 424/59 |
| 5,624,663 A * | 4/1997 | Deflandre et al. | 424/59 |
| 5,705,545 A | 1/1998 | Avar et al. | 524/102 |

FOREIGN PATENT DOCUMENTS

GB 1115596 5/1968

OTHER PUBLICATIONS

"Spectrophotometric Study Of The Photostabilization of PVC By A Benzylidene Malonate," by B.D. Gupta, L. Jirackova–Audouin and J. Verdu, Eur. Poly., J., vol. 24, No. 10., 1988, pp. 947–951.

"Some Aspects of The Light Protection Of Polymers," H.J. Heller and H.R. Blattmann, Pure and Applied Chemistry, vol. 30 (1972), pp. 145–163.

"Inhibiting Color Fading of Dyed Candles with CYA-SORB® Light Absorbers," F.A. Ballentine and A.H. Wagner, Cytec Industries, Stamford, Ct (1996).

CAS Registry No. 7443–25–6, Cyasorb UV 1988, American Chemical Society (1988).

Kirk–Othmer, Encyclopedia of Chemical Technology, 4$^{th}$ Edition, vol. 25, John Wiley & Sons, 1998, pp. 614–626.

CAS Registry No. 131459–42–2.

* cited by examiner

Primary Examiner—Edward J. Cain
(74) Attorney, Agent, or Firm—Susan S. Jackson; Scott E. Hanf

(57) ABSTRACT

Disclosed are improved solid, colored wax-based article having longer color shelf-life. The invention comprises a synthetic wax, a colorant, and an effective amount of a compound of the formula (1)

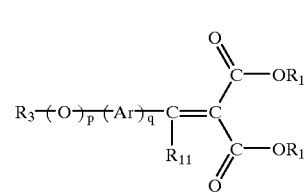

(1)

having symbols defined in the text.

The preferred embodiments of the articles contain (1) that exhibits a UV absorptivity greater than or equal to 70 liters per gram-cm. at a wavelength of less than or equal to 400 nm, as measured in either methanol, toluene or chloroform, using a conventional UV spectrophotometer.

The uses for the articles include candles, crayons, fertilizer coatings, rosebush coatings, plant grafting, sealants, suncracking protection of rubber and plastic products, paper coating, packaging food products, electrical insulation, waterproofing and cleaning compounds, carbon paper, and precision investment casting.

16 Claims, No Drawings

COLORED WAX ARTICLES

This application is a continuation of U.S. Application Ser. No. 09/169,877, filed Oct. 12, 1998, now U.S. Pat. No. 6,262,153.

FIELD OF THE INVENTION

The field pertains to shaped wax-based articles such as crayons, paper coatings, food packaging, candles, and the like.

BACKGROUND OF THE INVENTION

The term "wax", used herein is defined in accordance with the German Society of Fat Science as:

(1) at 20° C. it forms a solid whose consistency goes from kneadable to brittle;
(2) having a macro-to-micro-crystalline structure;
(3) melting at temperatures of 40° C. and above;
(4) a relatively low viscosity at temperatures slightly above its melting point;
(5) consistency and solubility that are strongly dependent upon temperature;and
(6) that which can be polished under slight pressure.

Among the various types of natural waxes are insect and animal waxes such as beeswax, lanolin, shellac wax, chinese insect wax, and spermaceti; vegetable waxes such as carnauba, candelila, japan wax, ouricury wax, rice-bran wax, jojoba wax, castor wax, bayberry wax, sugar cane wax, and maize wax; mineral waxes such as montan wax, peat wax, petroleum waxes including petrolatum, paraffin wax, semimicrocrystalline wax, and microcrystalline wax, ozokerite and ceresin waxes: and the synthetic waxes such as polyethylene wax, Fischer-Tropsch wax, chlorinated naphthalene wax, chemically modified wax, substituted amide wax, ester waxes, hydrogenated vegetable fats and derivatives, alpha olefins and polymerized alpha olefin wax.

Waxes are used in a variety of applications including, but not limited to, polishes, candles, crayons, fertilizer coatings, rosebush coatings, plant grafting, sealants, sun-cracking protection of rubber and plastic products, paper coating, packaging food products, electrical insulation, waterproofing and cleaning compounds, carbon paper, and precision investment casting.

Some polymers of higher alpha olefins, for example $C_{>20}$, are waxes and are sold as synthetic waxes. The polymerization process yields highly branched materials, typically with broad molecular weight distributions. Properties of the individual products are highly dependent on the alpha olefin monomers and polymerization conditions The molecular structure of poly($\alpha$-olefins) is sometimes used to modify the properties of paraffin wax, primarily for improving shape retention in unsupported, molded or dipped articles, such as candles. The products can increase the hardness and opacity of the paraffin, without increasing the cloud point or viscosity.

U.S. Pat. No. 4,060,569 relates to hydrocarbon polymers having lower penetration or greater hardness, greater viscosities, higher molecular weights, but having melting points and congealing points which are essentially no higher, but preferably lower than the original hydrocarbon. U.S. Pat. No. 4,239,546 relates to the use of hydrocarbon polymers to improve the hardness of waxes. In both patents, the hydrocarbons employed are primarily alpha olefins of the formula $RCH=CH_2$ but also include alpha olefins of the

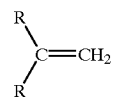

vinylidene structure or a mixture of alpha olefins, vinylidenes, internal olefins and saturates.

An application of particular commercial importance is the colored, molded wax candle. Over the years, there has been an increasing desire in the marketplace and a need by candle manufacturers for a colored candle that does not fade when exposed to fluorescent light or ultraviolet (UV) light. UV light is known to break chemical bonds in colorants and waxes, resulting in loss of original properties. Colorants, such as dyes and pigments, can fail due to strong UV light absorption resulting in rapid color fading. An organic mixture or compound, such as a colorant or wax, can also degrade through free radical attack. UV absorber can be used to dissipate the absorbed energy as heat. Commercial UV absorbers used for UV stabilization of waxes are the hydroxy substituted benzophenones and benzotriazoles. These compounds differ in cost, solubility, volatility, and their absorptivity at specific wavelengths.

The use of UV absorbers in cosmetic compositions for human skin and hair applications is known. U.S. Pat. No. 5,508,025 discloses UV absorbers and cosmetic compositions containing a naphthalene methylenemalonic diester.

The use of UV absorbers in plastics and coatings to enhance weather resistance is known. U.S. Pat. No. 4,301,209 discloses a radiation curable coating composition comprising a benzylidene malonic acid ester UV light absorber of the formula

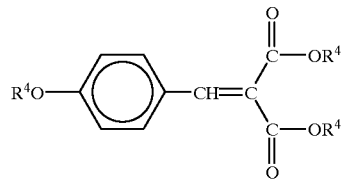

wherein $R^4$ is independently alkyl or hydroxyalkylene.

It is known from U.S. Pat. Nos. 4,260,732 and 4,404,257 to stabilize polycarbonate resins for improved resistance to UV radiation with UV absorber (UVA) compounds including the benzophenone derivatives, benzotriazole derivatives, benzoate esters, phenyl salicylates, derivatives of crotonic acid, malonic acid esters, and cyanoacrylates. U.S. Pat. No. 5,439,958 discloses piperidine compounds which can be used as light stabilizers, heat stabilizers, and oxidation stabilizers for organic materials, in particular synthetic polymers.

Thermal degradation is a concern primarily during manufacturing processes where a wax is held for extended lengths of time at or above the melt temperature. Antioxidants are often added to the melted wax to inhibit degradation during manufacturing. The melting point of thermally degraded candle wax is lower than the original wax material. The thermally degraded material also becomes more UV light sensitive and accelerates the photodegradation of dyes.

The problem of rapid color fading is manifested in finished candles which are displayed at the point of purchase under exposure to sunlight and/or fluorescent light. Even fluorescent light (wavelength from 290 to 380 nm) causes colored candles to fade noticeably in a short period of time. Premature color fading is therefore problematic for decorative wax articles and there is a continuing need for longer shelf-life yet there is no basis for predicting improved stabilizing effects in relatively low molecular weight, non-polar waxes based on observations of effects seen among the stabilizers used for high polymers which are polar in nature. A surprising improvement in the color retention and shelf life of wax-based articles has been observed with a particular UV absorber. The UV absorbing additives which show the improvement exhibit a UV absorptivity greater than or equal to 40 liters per gram-cm. at a wavelength of less than or equal to 400 nm, as measured in either methanol, toluene or chloroform, using a UV spectrophotometer.

SUMMARY OF THE INVENTION

It is an object of the present invention to produce an improved solid, colored, molded wax-based article having surprisingly longer color shelf-life. The invention comprises a synthetic wax, a colorant, and an effective amount of a compound of the formula (1)

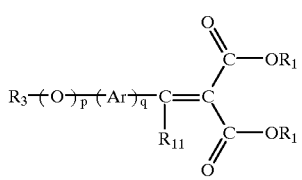

(1)

wherein $R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N—$C_{1-20}$-alkyl groups, —N-cyclic-$C_{1-10}$-alkyl groups, and cyclic-N—$C_{1-10}$-alkyl groups;

$R_{11}$ is hydrogen or $C_1$–$C_8$ alkyl;

p and q are independently 0 or 1;

Ar is a substituted or unsubstituted aromatic single ring or a substituted or unsubstituted aromatic fused 2 or 3 ring group or a heteroaromatic single ring or a heteroaromatic fused 2 or 3 ring group, for example a substituted or unsubstituted phenyl or naphthyl group;

$R_3$ is hydrogen, $C_1$–$C_{18}$alkyl, $C_5$–$C_{12}$cycloalkyl unsubstituted or mono-, di- or tri-substituted by $C_1$–$C_4$alkyl, or $C_7$–$C_9$ phenylalkyl unsubstituted or mono-, di- or tri-substituted on the phenyl by $C_1$–$C_4$alkyl, or preferably a hindered amino group selected from (i) to (xi):

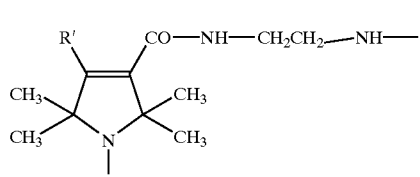

(i)

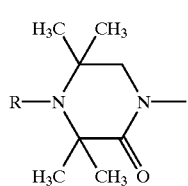

(ii)

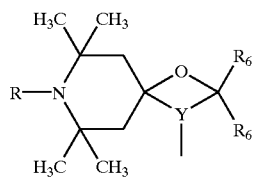

(iii)

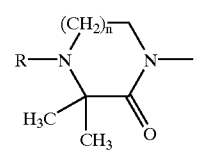

(iv)

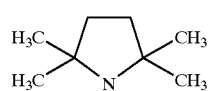

(v)

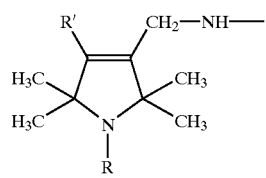

(vi)

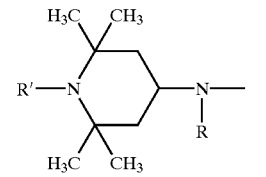

(vii)

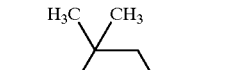

(viii)

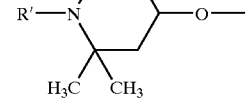

(ix)

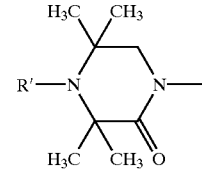

(x)

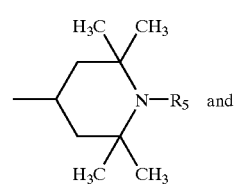

(xi)

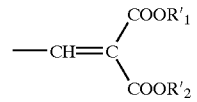

wherein

R, R' and $R_5$ are independently either hydrogen, $C_{1-12}$alkyl, $C_{1-8}$alkoxy, or —$COR_{3'}$, where $R_{3'}$ is hydrogen, $C_{1-6}$alkyl, phenyl, —COO($C_{1-4}$alkyl) or $NR_{15}R_{16}$, where $R_{15}$ and $R_{16}$ are independently hydrogen, $C_{1-12}$alkyl, $C_{5-6}$cycloalkyl, phenyl or ($C_{1-12}$ alkyl)phenyl; or $R_{15}$ and $R_{16}$ together with the N-atom to which they are attached form a five- to seven-membered ring which may contain an additional N- or O-atom (preferably forming a piperidine or morpholine ring); n is 0 or 1 (structure iv); Y is the group —NCO or —OCN, where CO forms part of the cyclic structure; each $R_6$ of structure (iii) independently is selected from hydrogen, $C_{1-12}$alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—or —$C(CH_3)CH_2CH_2CH(CH_3)$—. Preferably R is hydrogen, $C_1$–$C_8$alkyl, O, OH, $CH_2CN$, $C_1$–$C_{18}$alkoxy, $C_5$–$C_{12}$cycloalkoxy, or $C_3$–$C_6$alkenyl, $C_7$–$C_9$ phenylalkyl unsubstituted or mono-, di- or tri-substituted on the phenyl by $C_1$–$C_4$alkyl; or aliphatic or aromatic $C_1$–$C_{10}$acyl.

The solid, colored, wax-based article of the present invention surprisingly has improved resistance to color loss from exposure to UV light and sunlight. The time until a noticeable loss of color intensity is many-fold longer compared to the state of the art for colored wax-based articles.

It is also an object of the present invention to produce a solid, colored, molded candle in a variety of shapes, sizes, and forms that has improved shelf-life that is more desirable to the consumer.

It is a further object of the invention to provide a wax concentrate consisting essentially of a wax and from about 0.5% to 5% by weight, and preferably 1% to 2%, by weight of a compound according to (1):

DESCRIPTION OF THE PREFERRED EMBODIMENTS

The wax-based articles comprise at least 75% by weight of a natural and/or synthetic wax, a colorant, and a compound of the formula (1) as essential in the present invention and takes the form of a solid, colored, shaped wax-based article that has distinct advantages over existing solid, colored, shaped wax-based articles. In particular, the article of the present invention has unexpected longer color life under exposure to UV light. The article can be prepared in any desired shape, size, or form. One such embodiment is a candle comprising a wick extending from within the mass of wax.

Dyes and pigments are among the colorants that may be used in the solid, colored, shaped wax-based article of the present invention. Fluorescent colorants can also be used as colorants in the present invention. Particular preference is given to oil soluble dyes. Oil soluble dyes that can be used as colorants in the present invention include, but are not limited to, C.I. Solvent Yellow 3, C.I. Solvent Green 3, C.I. Acid Black 429, C.I. Solvent Red 207, C.I. Phthalo Blue, C.I. Solvent Violet 13, C.I. Disperse Violet 17, C.I. Solvent Yellow 14, C.I. Solvent Blue 36, C.I. Solvent Yellow 33, C.I. Solvent Red 149, C.I. Solvent Yellow 56, C.I. Solvent Yellow 90, C.I. Solvent Red 26, C.I. Solvent Yellow 29, C.I. Solvent Red 24, C.I. Solvent Yellow 16, C.I. Solvent Yellow 72, C.I. Solvent Blue 104, C.I. Solvent Yellow 93, C.I. Solvent Yellow 98, C.I. Disperse Yellow 64, C.I. Solvent Yellow 24, C.I. Solvent Orange 60, C.I. Vat Red 41, C.I. Solvent Red 195, C.I. Solvent Red 111, C.I. Solvent Red 179, C.I. Solvent Red 135, C.I. Solvent Red 63, C.I. Disperse Violet 26, C.I. Solvent Violet 37, C.I. Solvent Green 28. C.I. Solvent Yellow 133, C.I. Solvent Yellow 164, C.I. Solvent Blue 122, C.I. Solvent Violet 49, C.I. Solvent Brown 122, C.I. Solvent Red 91, C.I. Solvent Red 164, and C.I. Solvent Blue 98. Pigments can also be used as colorants in the present invention. Particularly preferred are pigments that can act as oil soluble dyes which include, but are not limited to, C.I. Pigment Yellow 74, C.I. Pigment Yellow 192, and families thereof which are available in the art.

A blend of paraffin wax and synthetic wax can be used in the present invention. The natural waxes include but are not limited to the aforementioned insect and animal waxes such as beeswax, lanolin, shellac wax, chinese insect wax, and spermaceti; vegetable waxes such as carnauba, candelila, japan wax, ouricury wax, rice-bran wax. jojoba wax, castor wax, bayberry wax, sugar cane wax, and maize wax; mineral waxes such as montan wax, peat wax, petroleum waxes including petrolatum, paraffin wax. semimicrocrystalline wax, and microcrystalline wax; ozokerite, hydrogenated fats and derivatives, and ceresin waxes. The hydrogenated fats can be derived from soybean oil, palm oil, tallow and cottonseed oil, and the like which are commercially available.

The synthetic waxes that may be used in the present invention include, but are not limited to, polyethylene wax (m.w. up to about 6000), Fischer-Tropsch wax, chlorinated naphthalene wax, chemically modified wax, substituted amide wax, ester waxes, polymerized alpha olefin wax; or any blend of the above. Some of these synthetic waxes are commercially available as Shell® 100, Mobil® 130, Astor® 5212, monomeric α-olefin, e.g., Chevron® C30, and the polymerized form, Vyban® 103. A synthetic wax that is preferred in the present invention is a polymerized alpha olefin wax. More preferred are the synthetic waxes disclosed in U.S. Pat. Nos. 4,060,569 and 4,239,546, both of which are specifically incorporated herein by reference. Most preferred is a alpha olefin wax wherein the alpha olefin is an α-$C_{24}$–$C_{54}$, branched or linear, for example CAS No. 131459-42-2 which is commercially available as Chevron® C30.

The solid, colored, molded wax-based article of the present invention comprises a natural and/or a synthetic wax, an effective amount of colorant, and the compound of the formula (1) which exhibits a UV absorptivity greater than or equal to 40 liters per gram-cm. at a wavelength of less than or equal to 400 nm, as measured in either methanol, toluene or chloroform, using a UV spectrophotometer; the absorptivity of

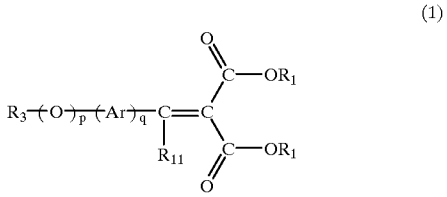

(1)

varies according to the selected substituents, wherein $R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N—$C_{1-20}$-alkyl groups, —N-cyclic-$C_{1-10}$-alkyl groups, and cyclic-N—$C_{1-10}$-alkyl groups, such as (I) to (xi) above;

p and q are independently 0 or 1;

$R_{11}$ is hydrogen or $C_{1-8}$ alkyl;

"Ar" is a substituted or unsubstituted aromatic single ring or a substituted or unsubstituted aromatic fused 2 or 3 ring group or a heteroaromatic single ring or a heteroaromatic fused 2 or 3 ring group, for example a substituted or unsubstituted phenyl or naphthyl group;

$R_3$ is hydrogen, $C_1$–$C_{18}$alkyl, $C_5$–$C_{12}$cycloalkyl unsubstituted or mono-, di- or tri-substituted by $C_1$–$C_4$alkyl, or $C_7$–$C_9$ phenylalkyl unsubstituted or mono-, di- or tri-substituted on the phenyl by $C_1$–$C_4$alkyl, or preferably a hindered amino group selected from (i) to (xi):

(i)
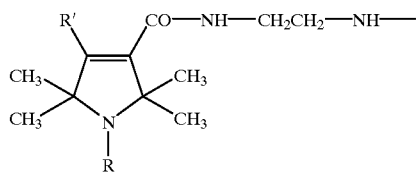

(ii)
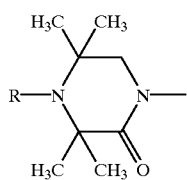

(iii)
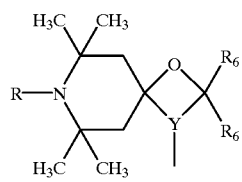

(iv)
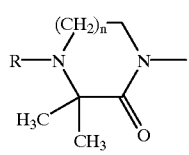

(v)
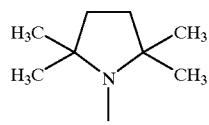

(vi)
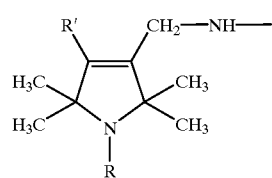

(vii)
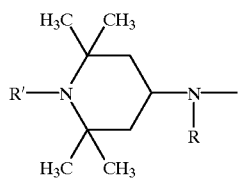

-continued (viii)
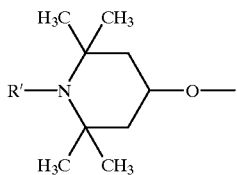

(ix)
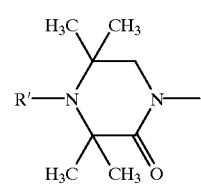

(x)
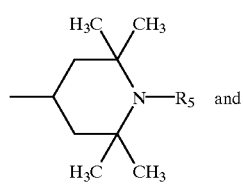

(xi)
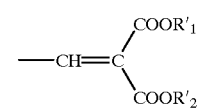

wherein

R, R', $R'_1$, $R'_2$ and $R_5$ are independently either hydrogen, $C_{1-12}$alkyl, $C_{1-8}$alkoxy, or —$COR_{3'}$, where $R_{3'}$ is hydrogen, $C_{1-6}$alkyl, phenyl, —COO($C_{1-4}$alkyl) or $NR_{15}R_{16}$, where $R_{15}$ and $R_{16}$ are independently hydrogen, $C_{1-12}$alkyl, $C_{5-6}$cycloalkyl, phenyl or ($C_{1-12}$alkyl)phenyl; or $R_{15}$ and $R_{16}$ together with the N-atom to which they are attached form a five- to seven-membered ring which may contain an additional N- or O-atom (preferably forming a piperidine or morpholine ring); n is 0 or 1 (structure iv); Y is the group —NCO or —OCN, where CO forms part of the cyclic structure; each $R_6$ of structure (iii) independently is selected from hydrogen, $C_{1-12}$alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—$CH_2$— or —$C(CH_3)CH_2CH_2CH(CH_3)$—. Preferably R is hydrogen, $C_1$–$C_8$alkyl, O, OH, $CH_2CN$, $C_1$–$C_{18}$alkoxy, $C_5$–$C_{12}$cycloalkoxy, or $C_3$–$C_6$alkenyl, $C_7$–$C_9$ phenylalkyl unsubstituted or mono-, di- or tri-substituted on the phenyl by $C_1$–$C_4$alkyl; or aliphatic or aromatic $C_1$–$C_{10}$acyl.

An alternative suitable compound according to formula (1) is (1a):

(1a)
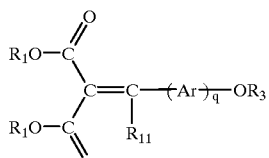

wherein p=1, each $R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl, or selected from groups (i) to (x), and
$R_3$, q, $R_{11}$, and Ar are defined as above for (1).

With respect to formula (1), when q=1, Ar is preferably phenyl and formula (1) has the following structure (1b):

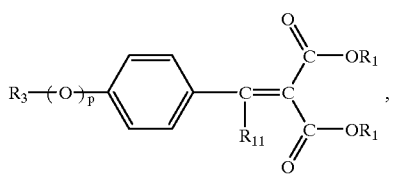

(1b)

wherein $R_1$, $R_3$, $R_{11}$, and p are defined as above for compound (1).

More preferably, p and q are each 1, Ar is phenyl, and the compounds of formula (1) are (1c):

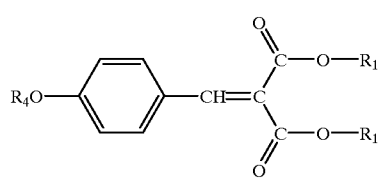

(1c)

Wherein $R_1$ is linear or branched $C_{1-10}$ alkyl, and $R_4$ is linear or branched $C_{1-10}$ alkyl or $C_{1-10}$ hydroxyalkyl. Particularly preferred for $R_1$ and $R_4$ are identical $C_{1-5}$ alkyl groups: methyl, ethyl, propyl, butyl, pentyl and hexyl groups.

The preferred embodiments of (1) exhibit a UV absorptivity greater than or equal to 70 liters per gram-cm. at a wavelength of less than or equal to 400 nm, as measured in either methanol, toluene or chloroform, using a conventional UV spectrophotometer. exhibits a UV absorptivity greater than or equal to 40 liters per gram-cm. at a wavelength of less than or equal to 400 nm, as measured in either methanol, toluene or chloroform, using a UV spectrophotometer. The most preferred embodiments of (1) exhibit a UV absorptivity greater than or equal to 90 liters per gram-cm. at a wavelength of less than or equal to 400 nm, as measured in either methanol, toluene or chloroform, using a UV spectrophotometer.

When p=1, and $R_1=R_4=CH_3$, formula (1) is the following most preferred formula (1c'):

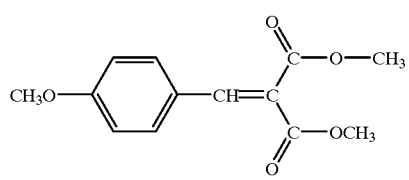

(1c')

(absorptivity of 1c' is 105 l/gm-cm at λ, <400 nm)

Specific examples of hydroxybenzylated malonates, include, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl) malonate, di[4-(1,1,3,3-tetramethylbutyl)-phenyl]-2,2-bis(3,5-di-tert-butyl-4-hydroxybenzyl)malonate.

Other examples of formula (1) include compounds containing one or more hindered amino groups (HALS). For example, the compound of the formula (1d) where q=1 and Ar=phenyl:

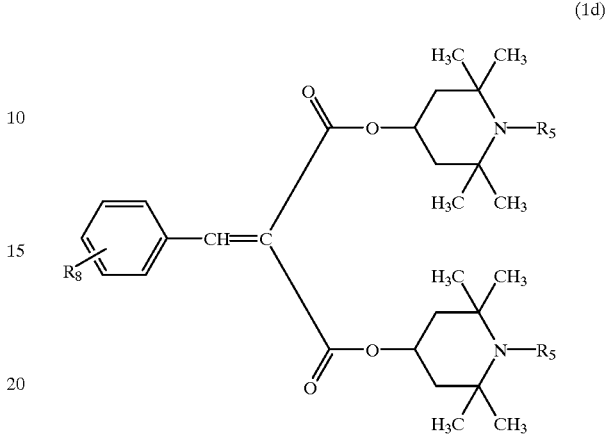

(1d)

wherein
$R_5$ is as defined as in (1) above, $R_8$ is hydrogen, $C_1$–$C_4$ alkyl, $C_1$–$C_8$ alkoxy, and preferably $R_8$ is para $C_1$–$C_8$ alkoxy, most preferably hydrogen, p-methoxy or p-ethoxy; and

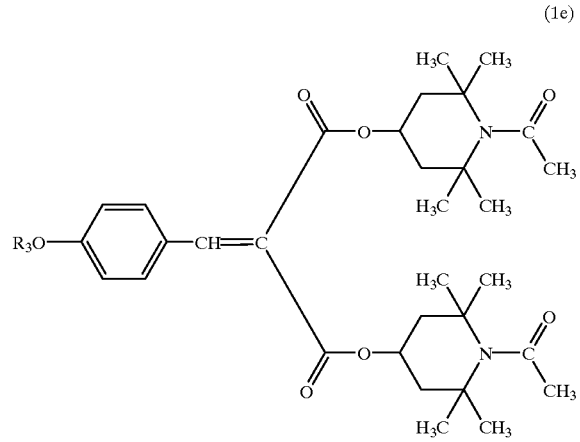

(1e)

wherein $R_3$ is defined as in (1) above.
For $R_3$=—$CH_3$, (1e) absorptivity=55 l/gm-cm at λ<400 nm.

Further examples of a composition comprising a natural and/or synthetic wax, a colorant, and stabilizer (1) are those in which the stabilizer selected from the following compounds:

bis(2,2,6,6-tetramethyl-4-piperidyl [[3,5-bis(I,I-dimethylethyl)-4-hydroxyphenyl]methyl]malonate;
bis(1,2,2,6,6-pentamethyl-4-piperidyl)-2-(4-methoxybenzylidene)malonate;
bis[2,2,6,6-tetramethyl-1-(1-oxo-2-propenyl)-4-piperidinyl] ester;
propanedioic acid, [[3,5-bis(1,1-dimethylethyl)-4-hydroxyphenyl]methyl]-butyl-bis(1,2,2,6,6-pentamethyl-4-piperidinyl)ester;
malonic acid,(3-tert-butyl-4-hydroxy-5-methylbenzyl)-dioctadecyl ester;
(p-methoxybenzylidene)malonic acid diethyl ester;
dimethyl (4-hydroxybenzylidene) malonate;
dimethyl (4-hydroxyphenyl) malonate;

di-isobutyl (p-methoxybenzylidene)malonate;
di-($C_{1-20}$alkyl)(4-phenylbenzylidene) malonate, e.g.;
  dimethyl, diethyl, or dibutyl-(4-phenylbenzylidene);and
tetraethyl-2,2'-[methylenebis(4,1-phenyleneiminocar-
  bonyl)]bismalonate.

Suitable compounds of formula (1) when p=0 and q=1 can be (2):

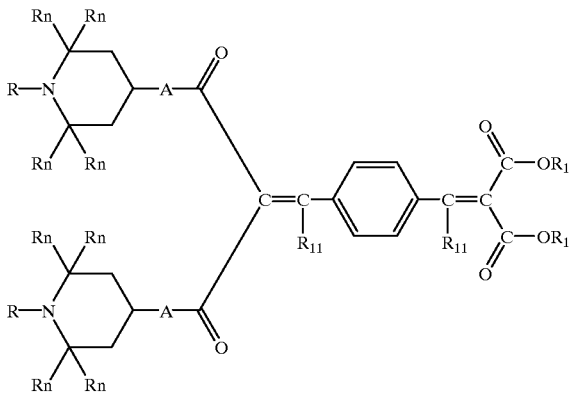

(2)

wherein
$R_1$ is R and $R_{11}$ are independently defined as for (1) above, and each Rn is independently —$CH_3$ or —$CH_2(C_{1-4}$alkyl) or adjacent Rn groups form a group —$(CH_2)_5$—, and
A is —O— or —N($C_{1-4}$alkyl)— or —NH—, and preferably —O—.

Alternatively, suitable compounds of formula (1), when p=0 and q=1 can be (2')

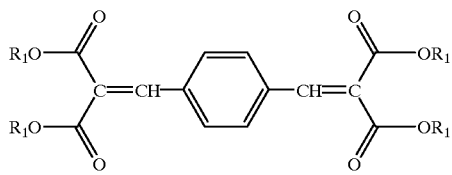

(2')

wherein each $R_1$ is independently defined as for compound (1) above.

Examples of alkyl groups having not more than 20 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl; exemplary branched alkyl groups are isopropyl, isobutyl, t-butyl, 2,2-dimethylpropyl, 2-methylpropyl, cyclohexylmethyl, cyclohexylethyl, 2-ethylhexyl, 3,5,5-trimethylhexyl, 2-hexylundecyl, and 5,7,7-trimethyl-2-(1,3,3-trimethylbutyl)hexyl; exemplary cyclic alkyl groups are cyclohexyl.

Examples of alkoxy groups are methoxy, ethoxy, propoxy, isopropoxy, butoxy, isobutoxy, pentoxy, isopentoxy, hexoxy, 2-ethylhexyloxy, heptoxy, octoxy, decyloxy, dodecyloxy, tetradecyloxy, hexadecyloxy and octadecyloxy, nonadecyloxy. Preferred alkoxy examples are $C_6$–$C_{12}$alkoxy, in particular heptoxy and octoxy.

Examples of the alkoxyalkylenoxyalkyl groups represented by $R^1$ and $R^2$ which are preferred are $C_{1-20}$-alkoxy-$C_{1-5}$-alkylenoxy-$C_{1-20}$-alkyl groups. The $C_{1-20}$-alkoxy groups and $C_{1-20}$-alkyl groups include those mentioned as examples of the alkoxyalkyl groups. Examples of the $C_{1-5}$-alkylenoxy groups include —$CH_2O$—, —$CH_2CH_2O$—, —$CH_2CH_2CH_2O$—,

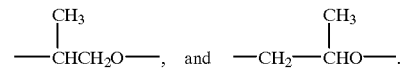

Particularly, $C_{1-12}$-alkoxy-$C_{1-5}$-alkylenoxy-$C_{1-12}$-alkyl groups are more preferred. Examples of $C_5$–$C_{12}$cycloalkyl $R_3$ unsubstituted or mono-, di- or tri-substituted by $C_1$–$C_4$alkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Unsubstituted or substituted cyclohexyl is preferred.

Examples of $R_3$ as $C_5$–$C_{12}$cycloalkoxy $R_1$ are cyclopentoxy, cyclohexoxy, cycloheptoxy, cyclooctoxy, cyclodecyloxy and cyclododecyloxy. Cyclopentoxy and cyclohexoxy are preferred.

Examples of $C_3$–$C_6$alkenyl are allyl, 2-methylallyl, butenyl and hexenyl, 3-butenyl, and 10-undecenyl; examples of branched alkenyl groups are 1-methyl-2-propenyl, 3-methyl-3-butenyl. Allyl is preferred.

Examples of $C_7$–$C_9$ phenylalkyl unsubstituted or mono-, di- or tri-substituted on the phenyl by $C_1$–$C_4$alkyl are benzyl, methylbenzyl, dimethylbenzyl, trimethylbenzyl, t-butylbenzyl and 2-phenylethyl. Benzyl is preferred.

Examples of aliphatic and aromatic $C_1$–$C_{10}$ acyl are $C_1$–$C_8$alkanoyl or $C_3$–$C_8$-alkenoyl, for example, acetyl, propionyl, butyryl, isobutyryl, pentanoyl, benzoyl, hexanoyl, heptanoyl, octanoyl, 2-ethylhexanoyl, acryloyl and crotonyl. Acetyl is preferred.

Examples of aliphatic $C_{1-10}$ acyl groups include, for example, acetyl, propionyl, butyryl, isobutyryl, pentanoyl, hexanoyl, heptanoyl, octanoyl, 2-ethylhexanoyl, acryloyl and crotonyl. Acetyl is preferred.

Those compounds of the formula (1) are preferred in which $R_1$ is hydrogen or $C_1$–$C_6$alkyl and $R_3$ is $C_1$–$C_{16}$alkyl, $C_5$–$C_8$cycloalkyl unsubstituted or mono-, di- or tri-substituted by $C_1$–$C_4$alkyl; benzyl unsubstituted or mono-, di- or tri-substituted on the phenyl by $C_1$–$C_4$alkyl; or a group of the formulas (i)–(x) above, preferably (x).

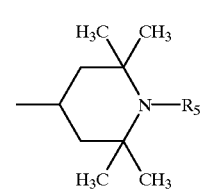

(x)

Preferable alkoxyalkyl groups represented by $R_5$ are $C_{1-20}$-alkoxy-$C_{1-20}$-alkyl groups, $C_{1-20}$-oxy-N—$C_{1-20}$-alkyl groups, especially $C_{1-20}$-oxy-N-cyclic-$C_{1-10}$-alkyl groups. Of $C_{1-20}$-alkoxy groups, with $C_{1-12}$-alkoxy groups more preferred among these.

Compounds of the formula (1) where q=1 are prepared according to processes disclosed in U.S. Pat. No. 5,705,545, incorporated herein by reference.

Compounds of the formula (1), where q=0 are prepared according to processes disclosed in U.S. Pat. No. 5,439,958, incorporated herein by reference. The most preferred additive in the shaped, colored wax article is available under the Sanduvor® mark, designated PR-25, from Clariant.

A specific example of formula (1) where Ar is napthyl, is a compound represented by formula (3):

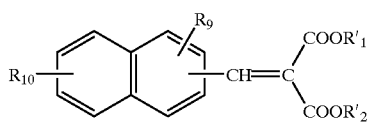

(3)

wherein $R'_1$ and $R'_2$ each independently represent a hydrocarbon group, an alkoxyalkyl group, or an alkoxyalkylenoxyalkyl group; $R_{10}$ represents a hydrogen atom, an alkoxy group, an alkenyloxy group, a hydroxy group, an acyl group, an alkyl group, or an alkenyl group; $R_9$ represents a hydrogen atom, an alkoxy group, an alkenyloxy group, a hydroxy group, an acyl group, an alkyl group, an alkenyl group, or

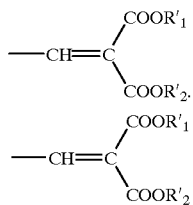

where $R'_1$ and $R'_2$ have the same meaning as above.

It is preferred that the alkoxy groups represented by $R_9$ and $R_{10}$ in formula (3) have 1 to 20 carbon atoms, with $C_{1-12}$ alkoxy groups being more preferred. Specific examples of such alkoxy groups include methoxy, ethoxy, isopropyloxy, t-butyloxy, and 2-ethylhexyloxy.

Alkenyloxy groups that have 2 to 20 carbon atoms are preferred, and $C_2$–$C_{12}$ alkenyloxy groups are more preferred. Examples of the naphthalene groups which are represented by Ar in formula (1) and which may optionally have substituents include those which have one or two substituents such as alkoxy, alkenyloxy, hydroxy, acyl, alkyl, alkenyl, or substituted with

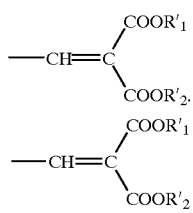

wherein $R'_1$ and $R'_2$ have the same meaning above. Specific examples of such alkenyloxy groups include allyloxy and 3-butenyloxy.

With reference to (3) it is preferred that the acyl groups have 2 to 20 carbon atoms. Among them, $C_2$–$C_{12}$ acyl groups are more preferred. Specific examples of such acyl groups include acetyl, propionyl, and benzoyl.

The alkyl groups and alkenyl groups are preferably $C_1$–$C_{20}$ alkyl groups and $C_2$–$C_{20}$ alkenyl groups. Particularly, $C_1$–$C_{12}$ alkyl groups and $C_2$–$C_{12}$ alkenyl groups are more preferred. Specific examples of such alkyl groups and alkenyl groups include the groups which were mentioned in relation to $R^1$ and $R^2$.

With reference to (3) it is particularly preferred that $R_9$ be a hydrogen atom, an alkoxy group or a hydroxy group. Also, it is particularly preferred that $R_{10}$ be a hydrogen atom, an alkoxy group, or a group of the formula

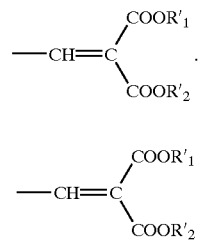

The Group

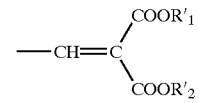

in formula (3) may be substituted at either the first or the second position of the naphthalene skeleton.

Also, among the compounds of formula (3) where $R_4$ is

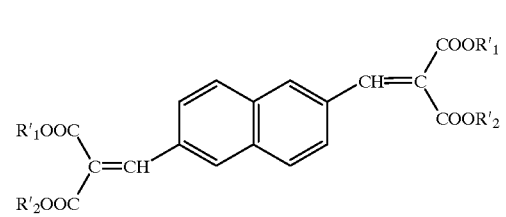

are those represented by formula (4) and are particularly preferred examples in respect of (1) where Ar is a napthyl group.

(4)

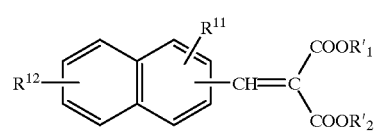

wherein $R_1'$ and $R_2'$ have the same meaning as defined above.

Among the compounds of formula (5) which are particularly preferred are:

(5)

wherein $R_{11}$ represents a hydrogen atom, a $C_1$–$C_{20}$ alkoxy group or a hydroxy group; $R_{12}$ represents a hydrogen atom, a $C_1$–$C_{20}$ alkoxy group; and $R_1'$ and $R_2'$ have the same meaning as defined above.

The method of producing the naphthalene methylenemalonate esters is disclosed in U.S. Pat. No. 5,508,025 incorporated herein by reference.

Naphthalenemethylenemalonate diesters are obtained by conventional condensation of (Knoevenagel condensation) an aromatic compound and a malonic diester with or without solvent and in the presence of a catalyst. Examples of suitable solvent for this reaction include benzene, toluene, xylene, tetrahydrofuran, 1,4-dioxane, and alcohols. Examples of the catalyst include amines such as piperidine and pyridine; acids such as acetic acid, benzoic acid, zinc chloride, and titanium tetrachloride; carboxylic acid salts such as sodium acetate and ammonium acetate; and acid anhydrides such as acetic anhydride. They may be used in suitable combinations. This reaction is preferably carried out with heat while removing water generated from the reaction.

In the reaction when a formyl group is present in the naphthylaldehyde derivative, two moles of malonic diester are condensed to produce the compounds of formulas (5) and (6).

The additive represented by the formula (5) can be added to molten wax in neat form or as is preferred, compounds such as (5) be carried by a suitable carrier. No restrictions are imposed on the carriers as long as they are inert with respect to the malonic diesters. The carriers may take solid, liquid, emulsion, foam, or gel forms. Examples of the carriers include water; alcohols; oils and fats such as hydrocarbons, fatty acid esters, higher alcohols, and silicone oils; fine powders such as starch and talc; and agents for aerosol jetting such as low-boiling point hydrocarbons and hydrocarbon halides.

The compound of formula (1) is added under stirring to molten wax during the formulation step at a temperature generally from 150° F. to 350° F., more typically, at 180° F. to 230° F., depending upon the melting point for (1), prior to processing into slabs, granules, chips, pellets, prills, bars and the like, or shaped articles may be formed directly from the molten formulated wax by conventional means for molding molten wax formulations. The means for molding candies includes the conventional candle forming methods, such as casting in a container as in a container candle, votive, taper.

An effective final concentration of compound (1) in a solid, colored shaped article can range from 0.02% to 0.5%, preferably 0.1 to 0.3%, and more preferably 0.1% of the compound (1) on weight of wax. In the concentrate embodiment consisting essentially of a wax and (1), the amount of (1) is advantageously higher, for example from 0.5% to 5% by weight, preferably 1.0% to 2.0% of (1) is contained therein on the weight of wax. The concentrate can be formulated as a natural color, or a colorant can be added. The following optional components may be included in a formulated wax compound according to the invention, such as fatty acids, fatty esters, ethylene-vinyl acetate polymer (VAM content <20%), rosin esters, white mineral oil, antioxidant, e.g. BHT or tocopherol, fragrance, e.g. vanillin, cinnamin, floral fragrance, and the like (See CTFA publications, at www.ctfa.com: low m.w. PE (<10,000 m.w.), hydrogenated fatty oils, petrolatum, beeswax, among the many other conventional additives can be included in the formulated wax containing (1).

The solid, colored, wax-based article of the present invention can be shaped in a conventional manner which includes, but is not limited to, casting, injection molding, extrusion, cold forming, vacuum forming, blow molding, compression molding, and transfer molding. The article may be in granular or slab form, or molded or otherwise formed into any shape, size, or form.

Shaped candle articles include container candles, pillar candles, and the well known tapered candles, as well as colored multilayered tapers, and the like. An exemplary multilayered taper candle has an overdipped layer, with colorant and (1) contained in the overdipped layer. A preferred tapered candle comprises hydrogenated fat and compound (1). Container candles comprise the wax and colorant and (1), the shape is the container. Containers are provided from glass vessels; and metal, ceramic, or pottery containers, and the like. Another preferred candle comprises bees wax, colorant, and compound (1).

EXAMPLES

Example 1

Votive candle base wax commercially available as Dussek Campbell no. 5454 was made by blending 4 kg of 130° F. melt point Fully Refined Paraffin (CASRN 64742-43-4), 4 kg of 150° F. melt point Fully Refined Paraffin (CASRN 64742-43-4), and 2 kg of 155° F. melt point olefinic wax (CASRN 131459-42-2). The mixture was heated to 180° F. and agitated for 20 minutes.

Example 2

1980 g of wax from Example 1 was mixed with 20 g of Rhodamine Red oil soluble dye and agitated for 20 minutes at 180° F.

Example 3

1900 g of wax from Example 1 was mixed with 100 g of Oil Yellow R oil soluble dye and agitated for 20 minutes at 180° F.

Example 4

1966 g of wax from Example 1 was mixed with 44 g of Oil Red oil soluble dye and agitated for 20 minutes at 180° F.

Example 5

199.8 g of dyed wax from Example 2 was mixed with 0.2 g of propanedioic acid, [(4-methoxyphenyl)methylene]-, dimethyl ester (CASRN 7443-25-6) and agitated for 20 minutes at 180° F. Two 2"×1.75" votive candles were poured into steel molds, allowed to cool overnight, and removed from the molds.

Example 6

199.8 g of dyed wax from Example 3 was mixed with 0.2 g of propanedicic acid, [(4-methoxyphenyl)methylene]-, dimethyl ester (CASRN 7443-25-6) and agitated for 20 minutes at 180° F. Two 2"×1.75" votive candles were poured into steel molds, allowed to cool overnight, and removed from the molds.

Example 7

199.8 g of dyed wax from Example 4 was mixed with 0.2 g of propanedioic acid, [(4-methoxyphenyl)methylene]-, dimethyl ester (CASRN 7443-25-6) and agitated for 20 minutes at 180° F. Two 2"×1.75" votive candles were poured into steel molds, allowed to cool overnight, and removed from the molds.

Comparative Example 1

199.8 g of dyed wax from Example 2 was mixed with 0.2 g of 2-(2-hydroxy-3,5-di-tert-amylphenyl)benzotriozole (CASRN 25973-55-1) and agitated for 20 minutes at 180° F. Two 2"×1.75" votive candles were poured into steel molds, allowed to cool overnight, and removed from the molds.

Comparative Example 2

199.8 g of dyed wax from Example 2 was mixed with 0.2 g of 2-hydroxy-4-n-octoxybenzophenone (CASRN 1843-05-6) and agitated for 20 minutes at 180° F. Two 2"×1.75" votive candles were poured into steel molds, allowed to cool overnight, and removed from the molds.

Comparative Example 3

199.8 g of dyed wax from Example 2 was mixed with 0.2 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Comparative Example 4

199.8 g of dyed wax from Example 2 was mixed with 0.1 g of 2-hydroxy-4-n-octoxy benzophenone (CASRN 1843-05-6) and 0.1 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Comparative Example 5

199.6 g of dyed wax from Example 2 was mixed with 0.4 g of 2-(2-hydroxy-3,5-di-tert-amylphenyl)benzotriozole (CASRN 25973-55-1) and agitated for 20 minutes at 180° F. Two 2"×1.75" votive candles were poured into steel molds, allowed to cool overnight, and removed from the molds.

Comparative Example 6

199.8 g of dyed wax from Example 3 was mixed with 0.2 g of 2-(2-hydroxy-3,5-di-tert-amylphenyl)benzotriozole (CASRN 25973-55-1) and agitated for 20 minutes at 180° F. Two 2"×1.75" votive candles were poured into steel molds, allowed to cool overnight, and removed from the molds.

Comparative Example 7

199.8 g of dyed wax from Example 3 was mixed with 0.2 g of 2-hydroxy-4-n-octoxybenzophenone (CASRN 1843-05-6) and agitated for 20 minutes at 180° F. Two 2"×1.75" votive candles were poured into steel molds, allowed to cool overnight, and removed from the molds.

Comparative Example 8

199.8 g of dyed wax from Example 3 was mixed with 0.2 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Comparative Example 9

199.8 g of dyed wax from Example 3 was mixed with 0.1 g of 2-hydroxy-4-n-octoxybenzophenone (CASRN 1843-05-6) and 0.1 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Comparative Example 10

199.8 g of dyed wax from Example 4 was mixed with 0.2 g of 2-(2-hydroxy-3,5-di-tert-amylphenyl)benzotriozole (CASRN 25973-55-1) and agitated for 20 minutes at 180° F. Two 2"×1.75" votive candles were poured into steel molds, allowed to cool overnight, and removed from the molds.

Comparative Example 11

199.8 g of dyed wax from Example 4 was mixed with 0.2 g of 2-hydroxy-4-n-octoxybenzophenone (CASRN 1843-05-6) and agitated for 20 minutes at 180° F. Two 2"×1.75" votive candles were poured into steel molds, allowed to cool overnight, and removed from the molds.

Comparative Example 12

199.8 g of dyed wax from Example 4 was mixed with 0.2 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Comparative Example 13

199.8 g of dyed wax from Example 4 was mixed with 0.1 g of 2-hydroxy-4-n-octoxybenzophenone (CASRN 1843-05-6) and 0.1 g of 2-(2-hydroxy-5-t-octylphenyl)-benzotriazole (CASRN 3147-75-9) and agitated for 20 minutes at 180° F. Two 2"×1.75" votive candles were poured into steel molds, allowed to cool overnight, and removed from the molds.

Tests were performed by placing a candle made with each color and additive into direct sunlight and under fluorescent light. Tests were also performed by placing a candle of each colored wax without an additive into direct sunlight and under fluorescent light. The samples were observed visually on weekly intervals to determine color fading. It was noted when initial color changes were first indicated and when any portion of the wax was completely devoid of color (i.e. bleached). The samples were studied over a twelve (12) week period. Table I lists the results of these tests.

TABLE I

LIGHT EXPOSURE TESTS

|  | Sunlight | | Fluorescent | |
| --- | --- | --- | --- | --- |
|  | Color Change | Bleached | Color Change | Bleached |
| Rhodamine Red Dye | | | | |
| Example 2-control | 1 week | 1 week | 1 week | 1 week |
| Example 5 | 5 weeks | 8 weeks | None after 12 weeks | None after 12 weeks |
| Comp. Example 1 | 2 weeks | 3 weeks | 4 weeks | 6 weeks |
| Comp. Example 2 | 2 weeks | 3 weeks | 4 weeks | 6 weeks |
| Comp. Example 3 | 2 weeks | 3 weeks | 4 weeks | 6 weeks |
| Comp. Example 4 | 2 weeks | 3 weeks | 4 weeks | 6 weeks |
| Comp. Example 5 | 4 weeks | 6 weeks | 8 weeks | 10 weeks |
| Oil Yellow R Dye | | | | |
| Example 3-control | 1 week | 1 week | 1 week | 1 week |
| Example 6 | 3 weeks | 3 weeks | 10 weeks | 10 weeks |
| Comp. Example 6 | 2 weeks | 2 weeks | 6 weeks | 6 weeks |
| Comp. Example 7 | 2 weeks | 2 weeks | 6 weeks | 6 weeks |
| Comp. Example 8 | 2 weeks | 2 weeks | 6 weeks | 6 weeks |
| Comp. Example 9 | 2 weeks | 2 weeks | 6 weeks | 6 weeks |
| Oil Red Dye | | | | |
| Example 4-control | 1 week | 1 week | 1 week | 1 week |
| Example 7 | 6 weeks | 9 weeks | None after 12 weeks | None after 12 weeks |
| Comp. Example 10 | 3 weeks | 6 weeks | 5 weeks | 7 weeks |
| Comp. Example 11 | 4 weeks | 6 weeks | 6 weeks | 8 weeks |
| Comp. Example 12 | 3 weeks | 6 weeks | 5 weeks | 7 weeks |
| Comp. Example 13 | 4 weeks | 6 weeks | 6 weeks | 7 weeks |

We claim:

1. A solid, colored, shaped wax-based article consisting essentially of:

a natural, and/or synthetic wax, a colorant, and and a compound of the formula (1)

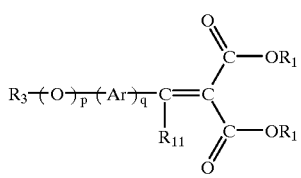
(1)

wherein $R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, —N-cyclic-$C_{1-10}$-alkyl groups, or cyclic-N-$C_{1-10}$-alkyl groups;

$R_{11}$ is hydrogen or $C_1$–$C_8$ alkyl;

p and q are independently 0 or 1;

Ar is a substituted aromatic single ring, an unsubstituted aromatic single ring, a substituted aromatic fused 2 or 3 ring group, an unsubstituted aromatic fused 2 or 3 ring group, a heteroaromatic single ring, or a heteroaromatic fused 2 or 3 ring group;

$R_3$ is hydrogen, $C_1$–$C_{18}$alkyl, $C_5$–$C_{12}$cycloalkyl unsubstituted or mono-, di- or tri-substituted by $C_1$–$C_4$alkyl, or $C_7$–$C_9$ phenylalkyl unsubstituted or mono-, di- or tri-substituted on the phenyl by $C_1$–$C_4$alkyl, or a hindered amino group selected from (i) to (xi):

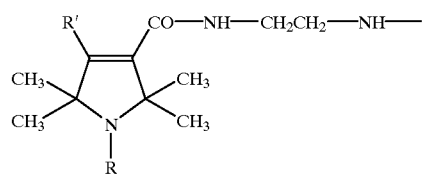
(i)

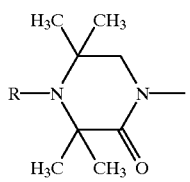
(ii)

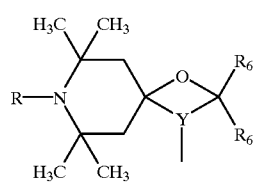
(iii)

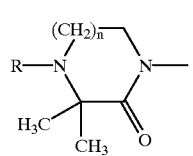
(iv)

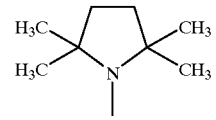
(v)

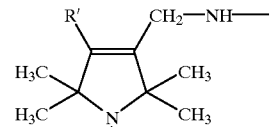
(vi)

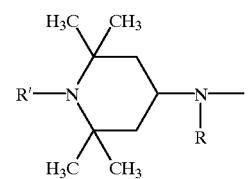
(vii)

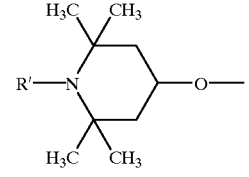
(viii)

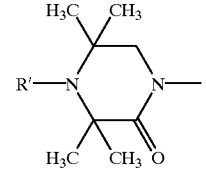
(ix)

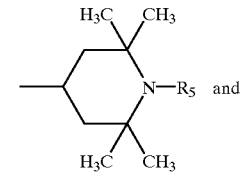
(x) and

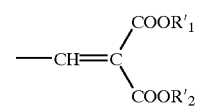
(xi)

wherein

R, R', $R'_1$, $R'_2$ and $R_5$ are independently either hydrogen, $C_{1-12}$alkyl, $C_{1-8}$alkoxy, or —$COR_{3'}$, where $R_{3'}$ is hydrogen, $C_{1-16}$alkyl, phenyl, —COO($C_{1-4}$alkyl) or $NR_{15}R_{16}$, where $R_{15}$ and $R_{15}$ are independently hydrogen, $C_{1-12}$alkyl, $C_{5-6}$cycloalkyl, phenyl or ($C_{1-12}$alkyl)phenyl; or $R_{15}$ and $R_{16}$ together with the N-atom to which they are attached form a five- to seven-membered ring which may contain an additional N- or O-atom; n is 0 or 1 (structure iv); Y is the group —NCO or —OCN, where CO forms part of the cyclic structure; each $R_6$ of structure (iii) independently is selected from hydrogen, $C_{1-12}$alkyl or phenyl provided only one $R_6$ can be phenyl, or both groups $R_6$ together form the group —$(CH_2)_m$—; where m is 2 to 11, —$C(CH_3)_2$—, —$C(CH_3)_2$—$CH_2$—$CH_2$— or —$C(CH_3)CH_2CH_2CH(CH_3)$—.

2. The article as claimed in claim 1 wherein said compound (1) exhibits a UV absorptivity greater than or equal to 40 liters per gram-cm. at a wavelength of less than or equal to 400 nm.

3. An article as claimed in claim 1, wherein said compound of the formula (1) is present in an amount from 0.02 weight % to 0.5 weight % on weight of wax.

4. An article as claimed in claim 2, wherein said compound of the formula (1) is present in an amount from 0.1 weight % to 0.3 weight % on weight of wax.

5. An article as claimed in claim 1, wherein said synthetic wax comprises a monomeric or polymeric alpha olefin.

6. An article as claimed in claim 1, wherein said alpha olefin is an alkene $C_{24}$–$C_{54}$, branched or linear.

7. An article as claimed in claim 1, wherein said colorant is a dye.

8. An article as claimed in claim 1 wherein compound (1) is:

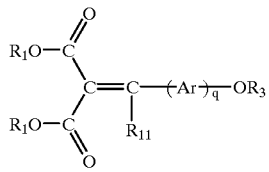

(1a)

each $R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl, or selected from groups (i) to (x), q=1, and $R_3$, $R_{11}$, and Ar are defined in claim 1.

9. The article of claim 1 wherein compound (1) is

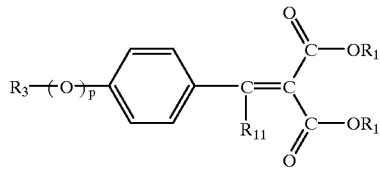

(1b)

wherein p is 0 or 1, and $R_1$, $R_3$, and $R_{11}$ are defined as in claim 1.

10. The article of claim 9 wherein compound (1) is

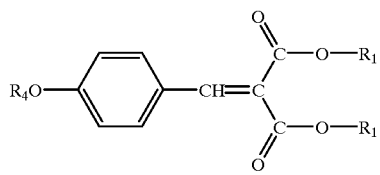

(1c)

wherein $R_1$ and $R_4$ are linear or branched $C_{1-6}$ alkyl groups.

11. A solid, shaped article comprising a wax and from 0.5% to 5% by weight on weight of said wax of a compound of the formula (A)

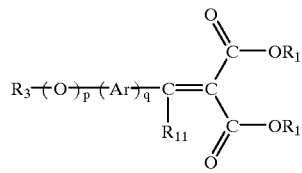

(A)

wherein $R_1$ is linear or branched $C_{1-10}$ alkyl, $R_4$ is linear or branched $C_{1-10}$ hydroxyalkyl, $R_{11}$ is hydrogen or $C_1$–$C_8$ alkyl group, p and q are independently 0 or 1, and $R_3$ is hydrogen, $C_1$–$C_{18}$ alkyl, $C_5$–$C_{12}$ cycloalkyl unsubstituted or mono-, di- or tri-substituted by $C_1$–$C_4$ alkyl, or $C_7$–$C_9$ phenylalkyl unsubstituted or mono-, di- or tri-substituted on the phenyl by $C_1$–$C_4$ alkyl, or a group selected from (I) to (xi) of claim 1.

12. The solid, shaped article of claim 11 wherein p and q are 1, $R_{11}$ is hydrogen, $R_1$ and $R_3$ are independently selected from the group consisting of methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl, isopropyl, isobutyl, t-butyl, 2,2-dimethylpropyl, 2-methylpropyl, cyclohexylmethyl, cyclohexylethyl, 2-ethylhexyl, 3,5,5-trimethylhexyl, 2-hexylundecyl, and 5,7,7-trimethyl-2-(1,3,3-trimethylbutyl)hexyl, and cyclohexyl groups.

13. The solid shaped article of claim 11 wherein (1) is:

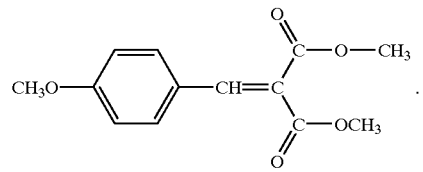

14. The solid, shaped article of claim 11 containing from 1% to 2% by weight of said (1) on weight of said wax.

15. The solid shaped article of claim 11 wherein (1) is:

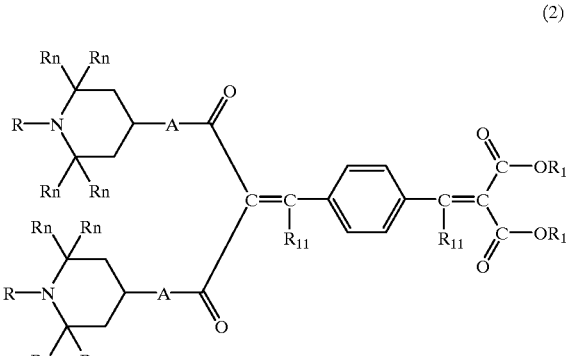

(2)

wherein
$R_1$ is independently $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N—$C_{1-20}$-alkyl groups, —N-cyclic-$C_{1-10}$-alkyl groups, or cyclic-N—$C_{1-10}$-alkyl groups; $R_{11}$ is hydrogen or $C_1$–$C_8$ alkyl; and
each Rn is independently —$CH_3$ or —$CH_2(C_{1-4}alkyl)$ or adjacent Rn groups form a group —$(CH_2)_5$—, and A is —O— or —$N(C_{1-4}alkyl)$— or —NH—.

16. The article of claim 1 wherein said colorant is selected from the group consisting of C.I. Solvent Yellow 3, C.I. Solvent Green 3, C.I. Acid Black 429, C.I. Solvent Red 207, C.I. Phthalo Blue, C.I. Solvent Violet 13, C.I. Disperse Violet 17, C.I. Solvent Yellow 14, C.I. Solvent Blue 36, C.I. Solvent Yellow 33, C.I. Solvent Red 149, C.I. Solvent Yellow 56, C.I. Solvent Yellow 90, C.I. Solvent Red 26, C.I. Solvent Yellow 29, C.I. Solvent Red 24, C.I. Solvent Yellow 16, C.I. Solvent Yellow 72, C.I. Solvent Blue 104, C.I. Solvent Yellow 93, C.I. Solvent Yellow 98, C.I. Disperse Yellow 64, C.I. Solvent Yellow 24, C.I. Solvent Orange 60, C.I. Vat Red 41, C.I. Solvent Red 195, C.I. Solvent Red 111, C.I. Solvent Red 179, C.I. Solvent Red 135, C.I. Solvent Red 63, C.I. Disperse Violet 26, C.I. Solvent Violet 37, C.I. Solvent Green 28, C.I. Solvent Yellow 133, C.I. Solvent Yellow 164, C.I. Solvent Blue 122, C.I. Solvent Violet 49, C.I. Solvent Brown 122, C.I. Solvent Red 91, C.I. Solvent Red 164, and C.I. Solvent Blue 98.

* * * * *